United States Patent
Deng (10) Patent No.: US 8,971,844 B2
(45) Date of Patent: Mar. 3, 2015

(54) CHARGING MONITORING METHOD, DEVICE AND SYSTEM

(71) Applicant: Huawei Technologies Co., Ltd., Shenzhen (CN)

(72) Inventor: Weicong Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 13/722,627

(22) Filed: Dec. 20, 2012

(65) Prior Publication Data

US 2013/0109346 A1    May 2, 2013

Related U.S. Application Data

(63) Continuation of application No. PCT/CN2010/076549, filed on Sep. 2, 2010.

(51) Int. Cl.
*H04M 11/00* (2006.01)
*H04W 4/26* (2009.01)
(Continued)

(52) U.S. Cl.
CPC .............. *H04W 4/26* (2013.01); *H04L 12/1417* (2013.01); *H04M 15/00* (2013.01);
(Continued)

(58) Field of Classification Search
CPC . H04M 15/85; H04M 12/1467; H04M 15/88; H04M 15/888; H04M 15/90; H04M 4/24; H04M 4/26; H04M 15/852
USPC .................. 455/432.1, 406; 379/114.1, 114.2
See application file for complete search history.

(56) References Cited

U.S. PATENT DOCUMENTS 6,567,657 B1 * 5/2003 Holly et al. .................... 455/408
7,877,084 B2 * 1/2011 Martin et al. ............... 455/414.1
(Continued)

FOREIGN PATENT DOCUMENTS

CN    1558694 A    12/2004
CN    1671166 A    9/2005
(Continued)

OTHER PUBLICATIONS

Written Opinion of the International Searching Authority issued in corresponding PCT Patent Application No. PCT/CN2010/076549, mailed Jun. 9, 2011, 4 pages.
(Continued)

*Primary Examiner* — Charles Shedrick
(74) *Attorney, Agent, or Firm* — Brinks Gilson & Lione (57) ABSTRACT

A charging monitoring method includes triggering a quota monitoring procedure for a consumption amount of an international roaming subscriber when it is determined that a service request is specific to the international roaming subscriber. The quota monitoring procedure is performed in a charging network element of an intelligent network system. The method also includes monitoring the consumption amount of the international roaming subscriber through the quota monitoring procedure to determine whether the consumption amount reaches a preset quota. If the consumption amount reaches the preset quota, the method includes rejecting the service request according to a rejection instruction returned by the charging network element. If the consumption amount does not reach the preset quota, the method includes approving the service request according to an approval instruction returned by the charging network element.

12 Claims, 5 Drawing Sheets

(51) Int. Cl.
   *H04L 12/14* (2006.01)
   *H04M 15/00* (2006.01)
   *H04W 4/24* (2009.01)

(52) U.S. Cl.
   CPC ......... *H04M 15/8038* (2013.01); *H04M 15/83* (2013.01); *H04M 15/85* (2013.01); *H04M 15/852* (2013.01); *H04M 15/88* (2013.01); *H04M 15/888* (2013.01); *H04M 15/90* (2013.01); *H04W 4/24* (2013.01); *H04L 12/1467* (2013.01)
   USPC ..................... 455/406; 455/432.1; 379/114.1; 379/114.2

(56) References Cited

U.S. PATENT DOCUMENTS

| | | | | |
|---|---|---|---|---|
| 2003/0072425 A1* | 4/2003 | Hurst | ...................... | 379/114.01 |
| 2004/0127194 A1* | 7/2004 | Lippelt | ......................... | 455/406 |
| 2006/0089139 A1 | 4/2006 | Allegretti | | |
| 2007/0136195 A1* | 6/2007 | Banjo | ............................ | 705/43 |
| 2008/0146200 A1* | 6/2008 | Martin et al. | .................. | 455/413 |
| 2009/0036122 A1 | 2/2009 | Lu et al. | | |
| 2010/0233994 A1* | 9/2010 | Cheng et al. | .................. | 455/406 |
| 2012/0123919 A1* | 5/2012 | Li et al. | .......................... | 705/34 |

FOREIGN PATENT DOCUMENTS

| | | |
|---|---|---|
| CN | 1859129 A | 11/2006 |
| CN | 1968428 A | 5/2007 |
| CN | 1997233 A | 7/2007 |
| WO | WO 2004016004 A1 | 2/2004 |

OTHER PUBLICATIONS

Office Action issued in corresponding Chinese Patent Application No. 201080003408.4, mailed May 6, 2013, 9 pages.
International Search Report issued in corresponding PCT Patent Application No. PCT/CN2010/076549, mailed Jun. 9, 2011.

* cited by examiner

CHARGING MONITORING METHOD, DEVICE AND SYSTEM

CROSS-REFERENCE TO RELATED APPLICATIONS

This application is a continuation of International Application No. PCT/CN2010/076549, filed on Sep. 2, 2010, which is hereby incorporated by reference in its entirety.

FIELD OF TECHNOLOGY

The present application relates to the communication field and, in particular, to a charging monitoring method, device, and system.

BACKGROUND OF THE APPLICATION

International roaming lets a mobile subscriber roam to another country without interrupting the service, and the subscriber abroad enjoys the experience as if at home, which facilitates communication and contact between the subscriber and the outside significantly. The existing international roaming technology is primarily based on Customized Application for Mobile Network Enhances Logic (CAMEL) and USSD Call Back (UCB) schemes. Such technologies employ a post-paid international settlement mode. The roaming operator provides an expense list for settlement with the home operator. The settlement mode is based on the credit and agreement between different operators. However, due to settlement delay and arrears, some roaming operators suffer considerable financial losses.

Currently, the method for implementing a local prepaid service of an international roaming subscriber in a mobile intelligent network that includes at least a mobile switching service center and a service control point generally includes the following steps: the local mobile service switching center sends an IDP message through a prepaid service trigger detection mechanism to trigger a local service control point; the local service control point initiates a prepaid service logic according to the IDP message; the local service control point creates a prepaid account corresponding to the international roaming subscriber; and the local service control point monitors the created prepaid account in real time, and contacts the local mobile service switching center to handle the call process. In this way, the charging for the service used by the international roaming subscriber is implemented.

At least the following problems are found in the charging monitoring for the expenses of the international roaming subscriber:

In the existing system, the charging for the consumption amount of the international roaming subscriber accounts for only the expenses generated when the international roaming subscriber applies for the service in the visited network, and the system is unable to obtain the actual balance of the account of the international roaming subscriber in the home network, nor to trigger an intelligent network of the visited network, and therefore, the visited network system is unable to restrict the consumption amount of the international roaming subscriber correctly according to the accounting quota, and unable to monitor the charging for the consumption amount of the international roaming subscriber accurately.

SUMMARY OF THE APPLICATION

Embodiments provide a charging monitoring method, device and system to solve the following problem in the prior art: in the existing visited network system, the charging for the consumption amount of the international roaming subscriber accounts for only the expenses generated when the international roaming subscriber applies for the service in the visited network, and the system is unable to obtain the actual balance of the account of the international roaming subscriber in the home network, nor to trigger the visited intelligent network, and therefore, the visited network system is unable to restrict the consumption amount of the international roaming subscriber correctly according to the charging quota, and unable to monitor the charging for the consumption amount of the international roaming subscriber accurately.

An embodiment provides a charging monitoring method, which includes:

triggering a quota monitoring procedure for a consumption amount of an international roaming subscriber if determining that a service request is specific to the international roaming subscriber, where the quota monitoring procedure is set in a charging network element of an intelligent network system; and monitoring the consumption amount of the international roaming subscriber through the quota monitoring procedure to check whether the consumption amount reaches a preset quota; if the consumption amount reaches the preset quota, rejecting the service request according to a rejection instruction returned by the charging network element; if the consumption amount does not reach the preset quota, approving the service request according to an approval instruction returned by the charging network element.

Another embodiment provides a charging monitoring device, which includes:

a judging and processing unit, a triggering unit, and a service processing unit.

The judging and processing unit is configured to judge whether a service request is sent by an international roaming subscriber according to a mobile number of a subscriber who sends the service request, and, if so, send a trigger instruction to the triggering unit.

The triggering unit is configured to trigger a quota monitoring procedure for a consumption amount of the international roaming subscriber according to the trigger instruction sent by the judging and processing unit, where the quota monitoring procedure is set in a charging network element of an intelligent network.

The service processing unit is configured to monitor the consumption amount of the international roaming subscriber through the quota monitoring procedure of the charging network element of the intelligent network to check whether the consumption amount reaches a preset quota; if the consumption amount does not reach the preset quota, approve the service request according to an approval instruction returned by the charging network element; and, if the consumption amount reaches the preset quota, reject the service request according to an rejection instruction returned by the charging network element.

Another embodiment provides another charging monitoring device, which includes:

an authenticating unit, a querying unit, a judging unit, and a service processing unit.

The authenticating unit is configured to authenticate a triggered service request, and determine the triggered service request as a specific roaming authentication request if it is determined that the service request carries a specific number.

The querying unit is configured to, after the authenticating unit determines the service request as a specific roaming authentication request, query a corresponding number segment table to determine a home operator of a mobile number of an international roaming subscriber who initiates a mobile originated service.

The judging unit is configured to judge whether an accrued expense of the operator in a current period reaches a preset quota.

The service processing unit is configured to return an instruction of rejecting the service request if the judging unit determines that the accrued expense reaches the preset quota, and return an instruction of approving the service request if the judging unit determines that the accrued expense does not reach the preset quota.

Another embodiment provides a charging monitoring system, which includes:

a device on a mobile switching center side and a device on an intelligent network system side, where the device on the mobile switching center side is set at the mobile switching center and is communicationally connected with the device on the intelligent network system side which is set in an intelligent network.

The device on the mobile switching center side includes:

a judging and processing unit, a triggering unit, and a service processing unit.

The judging and processing unit is configured to judge whether a service request is sent by an international roaming subscriber according to a mobile number of a subscriber who sends the service request, and, if so, send a trigger instruction to the triggering unit.

The triggering unit is configured to trigger a quota monitoring procedure for a consumption amount of the international roaming subscriber according to the trigger instruction sent by the judging and processing unit, where the quota monitoring procedure is set in a charging network element of an intelligent network.

The service processing unit is configured to monitor the consumption amount of the international roaming subscriber through the quota monitoring procedure of the charging network element of the intelligent network to check whether the consumption amount reaches a preset quota; if the consumption amount does not reach the preset quota, approve the service request according to an approval instruction returned by the charging network element; and, if the consumption amount reaches the preset quota, reject the service request according to an rejection instruction returned by the charging network element.

The device on the intelligent network system side includes:

an authenticating unit, a querying unit, a judging unit, and a service processing unit.

The authenticating unit is configured to authenticate a triggered service request, and determine the triggered service request as a specific roaming authentication request if it is determined that the service request carries a specific number.

The querying unit is configured to, after the authenticating unit determines the service request as a specific roaming authentication request, query a corresponding number segment table to determine a home operator of a mobile number of an international roaming subscriber who initiates a mobile originated service.

The judging unit is configured to judge whether an accrued expense of the operator in a current period reaches a preset quota.

The service processing unit is configured to return an instruction of rejecting the service request if the judging unit determines that the accrued expense reaches the preset quota, and return an instruction of approving the service request if the judging unit determines that the accrued expense does not reach the preset quota.

As revealed in the technical solutions of embodiments, when the international roaming subscriber sends a service request, the method disclosed in the embodiments, by triggering a quota monitoring procedure for the consumption amount of the international roaming subscriber in the charging network element of the intelligent network system, monitors whether the international roaming subscriber exceeds the preset quota for the consumption amount in real time, and decides whether to approve or reject the service request of the international roaming subscriber according to the approval instruction or rejection instruction returned by the charging network element after the preset quota is monitored. Through this method, the visited network system may trigger the charging network element of the intelligent network system after determining that the service request is sent by the international roaming subscriber, the charging network element may decide whether to return an approval instruction or rejection instruction according to the preset quota set for the operator of the home network, and the visited network system may approve or reject the service request sent by the international roaming subscriber according to the corresponding instruction. The visited network system may use the credit limit of the operator of the home network to control the service request of the international roaming subscriber, thereby making the system monitor the charging for the consumption amount of the international roaming subscriber more accurately, and overcoming the inability of the existing system in monitoring the charging for the consumption amount of the international roaming subscriber accurately.

DETAILED DESCRIPTION OF THE EMBODIMENTS

The present disclosure will be described in more detail with reference to accompanying drawings and preferred embodiments.

The monitoring method provided by embodiments for the consumption amount of an international roaming subscriber controls the service request of the international roaming subscriber conveniently according to the credit limit of the operator of the home network, improves accuracy of the charging for the consumption amount, and avoids the operator's economic losses caused by the inability of monitoring the consumption amount of the international roaming subscriber.

Embodiment 1

Figure 1:
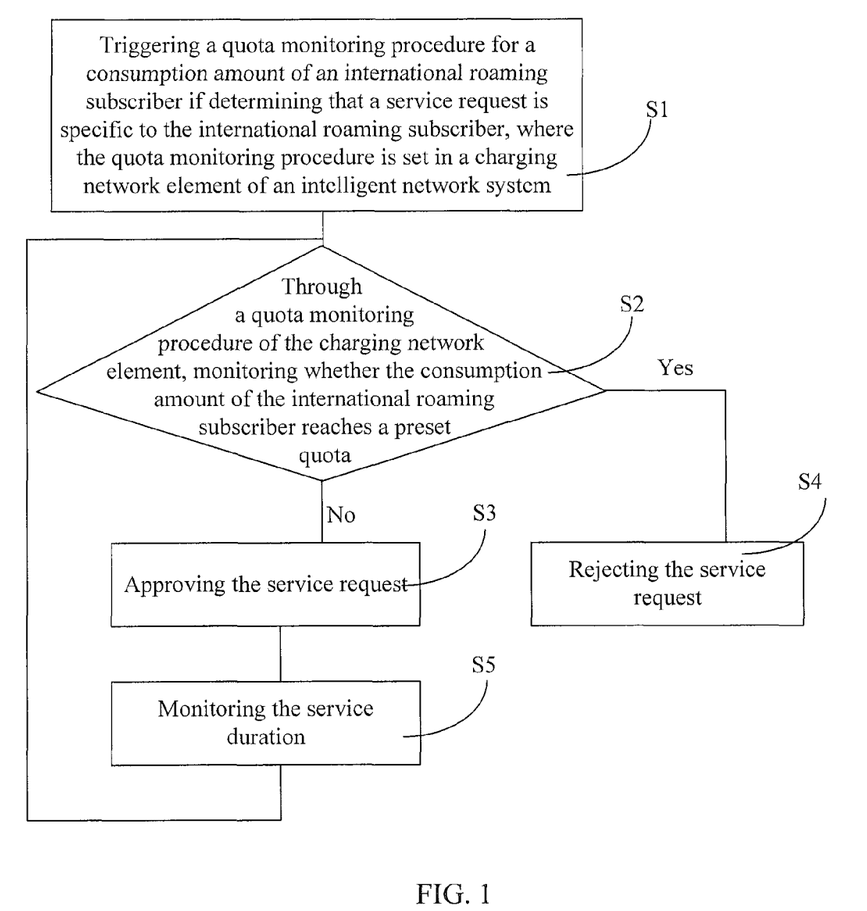
FIG. 1 is a flowchart of a charging monitoring method according to Embodiment 1.

This embodiment provides a charging monitoring method to monitor the consumption amount of the international roaming subscriber accurately. As shown in FIG. 1, the method includes the following steps:

Step S1: triggering a quota monitoring procedure for a consumption amount of an international roaming subscriber if determining that a service request is specific to the international roaming subscriber, where the quota monitoring procedure is set in a charging network element of an intelligent network system;

the detailed process of step S1 is:

determining the service request as a service request sent by the international roaming subscriber if the mobile number of the subscriber who sends the service request is an international roaming number;

storing a specific number, a visited intelligent network service key, and a GT code in a mobile switching center, replacing the number of the corresponding party of the international roaming subscriber in the service request sent by the international roaming subscriber with the specific number stored in the mobile switching center, and storing the replaced original number;

letting the service request use the stored visited intelligent network service key and GT code to trigger the quota monitoring procedure for the consumption amount of the international roaming subscriber in the charging network element of the intelligent network system. Specifically, the charging network element of the intelligent network system authenticates the service request; if the charging network element of the intelligent network system determines the service request carries the specific number, the service request is determined as a specific roaming authentication request; and after the charging network element determines the service request as a roaming authentication request, querying a corresponding number segment table to judge whether the accrued expense of the home operator of the mobile number of the international roaming subscriber in the service request in the current period reaches a preset quota (namely, judge whether the sum of the accrued expense of the international roaming subscriber in the period and the consumption amount of the current service request is greater than the preset quota of the international roaming subscriber); if the preset quota is reached, returning a rejection instruction to reject the service request; if the preset quota is not reached, returning an approval instruction to approve the service request;

Step S2: monitoring the consumption amount of the international roaming subscriber through the quota monitoring procedure of the charging network element to check whether the consumption amount reaches the preset quota; if the consumption amount does not reach the preset quota, the charging network element returns an approval instruction and performs step S3; if the consumption amount reaches the preset quota, the charging network element returns a rejection instruction, and performs step S4;

Step S3: approving the service request according to the approval instruction returned by the charging network element; and Step S4: rejecting the service request according to the rejection instruction returned by the charging network element.

Optionally, the method may further comprise step S5 after step S3: in the service implementation process after the service request is approved, the charging network element of the intelligent network system monitors the corresponding service duration to check whether the consumption quota of the international roaming subscriber reaches the preset quota.

In an actual procedure, the details of the foregoing method are as follows:

if the mobile number of the subscriber who sends the service request is an international roaming number, determining the service request as a service request sent by the international roaming subscriber;

storing a specific number, a visited intelligent network service key, and a GT code in the mobile switching center (wherein, the service key uniquely identifies a service, many services may be deployed in a service plane (network element), and the specific service to be triggered is identified by the service key; the Global Title (GT) code uniquely identifies a network element globally), and replacing the number of the corresponding party of the international roaming subscriber in the service request sent by the international roaming subscriber with the specific number stored in the mobile switching center, and storing the replaced original number;

letting the service request use the stored visited intelligent network service key and the GT code to uniformly trigger a set intelligent network system to authenticate the service request. If the intelligent network system determines that the service request carries the specific number, the service request is determined as a specific roaming authentication request; and after the intelligent network system determines the service request as the roaming authentication request, querying the corresponding number segment table to judge whether the accrued expense of the home operator of the mobile number of the international roaming subscriber in the service request in the current period reaches a preset quota; if the preset quota is reached, rejecting the service request; if the preset quota is not reached, approving the service request.

In the foregoing procedure, if the service initiated for the international roaming subscriber is a mobile originated service, the called number in the mobile originated service is replaced with the specific called number in the specific number stored in the mobile switching center, and the replaced original called number is stored. If the service initiated for the international roaming subscriber is a mobile terminated service, the calling number in the mobile terminated service is replaced with the specific calling number in the specific number stored in the mobile switching center, and the replaced original calling number is stored.

In an actual procedure, the visited network system may set the corresponding quota for each subscribing operator in a visited country according to relevant dimensions (such as operator scale, history record of payment) so that the roaming expense of subscribers of an operator in the visited country is controlled within a controllable range.

The operator of the visited network accrues and statisticizes the expense of the roaming subscriber in each operator in the visited country in a period.

The trigger logic (special called number, special calling number, visited intelligent network service key, and GT code are stored on the MSC) of the mobile switching center (MSC) of the existing system is modified; and, if the calling subscriber or the called subscriber is determined as a roaming number that travels abroad, uniformly triggering authentication in a set intelligent network system, the called number is modified to a special number, and the original called number is stored; the intelligent network system queries the corresponding number segment table to check whether the accrued expense of the home operator of the calling subscriber in the current period reaches the preset quota, and releases the call if the preset quota is reached, or delivers a CONNECT instruction (the destination number is a special number) if the preset quota is not reached.

If the delivered CONNECT instruction received by the MSC is a special number, the MSC replaces the special number with the true called number stored originally to perform routing, and reports the corresponding duration to the intelligent network system of the visited network.

In embodiments, when an international roaming subscriber sends a service request, the method as disclosed, by triggering a quota monitoring procedure for the consumption amount of an international roaming subscriber, monitors whether the international roaming subscriber exceeds the preset quota for the consumption amount in real time, and decides whether to approve or reject the service request of the international roaming subscriber according to the preset quota. Through this method, the visited network system may trigger the charging network element of the intelligent network system after determining that the service request is sent by an international roaming subscriber, the charging network element may decide whether to return an approval instruction or a rejection instruction according to the preset quota set for an operator of the home network, and the visited network system may approve or reject the service request sent by the international roaming subscriber according to the corresponding instruction. The visited network system may use the credit limit of the operator of the home network to control the service request of the international roaming subscriber, thereby making the system monitor the charging for the consumption amount of the international roaming subscriber more accurately, and overcoming the inability of the existing system in monitoring the charging for the consumption amount of the international roaming subscriber accurately.

The following describes the monitoring method in more detail with reference to embodiments of the monitoring process in a mobile originated service procedure, a mobile terminated service procedure, and a short message service procedure respectively.

Embodiment 2

Figure 2:
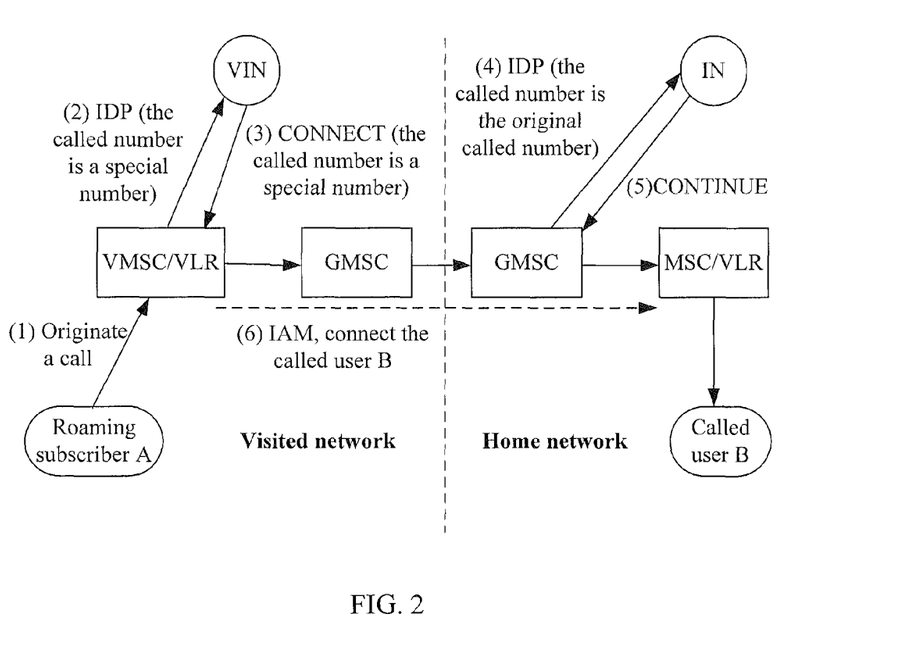
FIG. 2 is a schematic diagram of a mobile originated service procedure according to Embodiment 2.

This embodiment provides a charging monitoring method to monitor the consumption amount of the international roaming subscriber accurately. The following takes a mobile originated (MO) service procedure shown in FIG. 2 as an example to describe the monitoring method:

(1) a roaming subscriber A 002784006800 originates a call to a called number 002783005123 (supposing that a South African subscriber roams to China);

(2) the visited mobile switching center (MSC) determines that the calling subscriber is a roaming subscriber from abroad according to information on a visited location register (VLR), stores the called number B002783005123 and replaces the current called number with a previously defined special called number (008613800016800), and reports an IDP message for the call (the calling number is the roaming subscriber A002784006800, and the called number is the special number 008613800016800) to the visited intelligent network (IN) first to trigger a mobile originated procedure based on the set GT code (008613912316800) and service key 100;

(3) the visited IN determines that the called number is the special number, and recognizes this is an authentication request of the roaming subscriber, and therefore, queries a number segment table according to the calling number to obtain corresponding operator information, queries a credit limit of the operator and an accrued expense in the current period, and calculates the expense generated in the current service request; if the accrued expense is greater than or equal to the credit limit, the visited IN releases the call directly; if the accrued expense is less than the credit limit, the visited IN delivers a CONNECT instruction to connect up the call (the called number is the special number 008613800016800), and monitors the call duration at the same time;

(4) after receiving the CONNECT instruction delivered by the intelligent network, the visited MSC recovers the called number B: 002783005123, and sends an IDP message to a home intelligent network to trigger the mobile originated procedure;

(5) the home intelligent network authenticates the calling subscriber, and delivers a CONTINUE instruction if the authentication succeeds.

(6) the VMSC of the visited network receives the instruction from the home IN and then sends an IAM message to connect the called subscriber B: 002783005123; and the home network is connected to the called subscriber B: 002783005123, and the call is set up.

Embodiment 3

Figure 3:
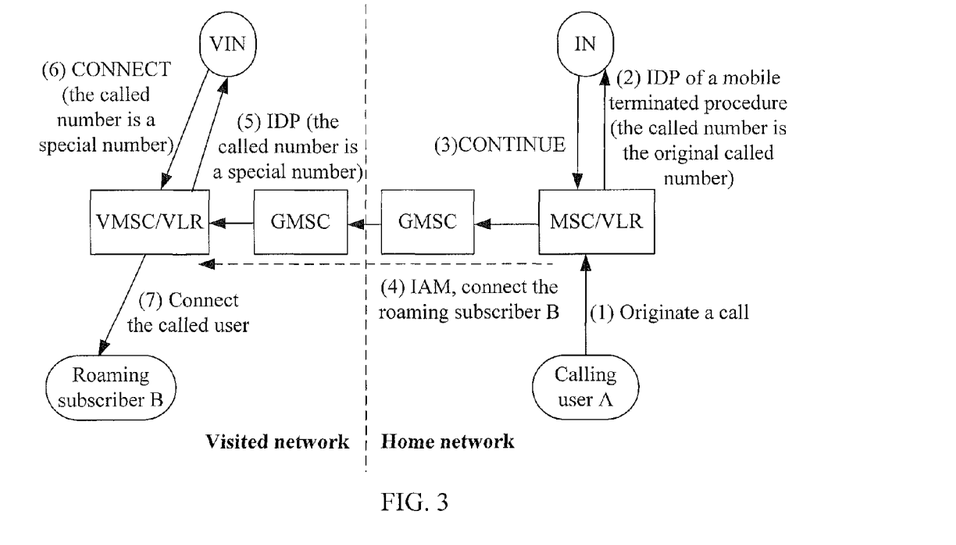
FIG. 3 is a schematic diagram of a mobile terminated service procedure according to Embodiment 3.

This embodiment provides a charging monitoring method to monitor the consumption amount of an international roaming subscriber accurately. The following takes a mobile terminated (MT) service procedure shown in FIG. 3 as an example to describe the monitoring method:

(1) a calling subscriber A originates a call.

(2) the home MSC of the calling subscriber A triggers the mobile originated procedure according to the O-CSI of the subscriber A, and then reports an IDP according to the subscription information T-CSI of the called subscriber (visited subscriber) to trigger a mobile terminated procedure of the home IN;

(3) after the authentication succeeds, the home IN delivers a CONTINUE instruction to the home MSC;

(4) the home MSC sends an IAM, and routes the call to the visited network through a gateway MSC (GMSC);

(5) the MSC in the visited network determines that the called number is an international roaming subscriber according to the information on the VLR, and therefore, changes the calling number to a special number, and reports an IDP message to trigger a mobile terminated procedure to the visited IN; and the visited intelligent network determines that the calling number is the special number, and regards it as a special roaming authentication request; the visited intelligent network queries a number segment table to obtain a corresponding operator information according to the called number, queries the credit limit of the operator and the accrued expense in the current period, and calculates the expense generated in the current service request; if the accrued expense is greater than or equal to the credit limit, the visited intelligent network releases the call directly; if the accrued expense is less than the credit limit, the visited intelligent network delivers a CONNECT instruction to connect up the call, and monitors the call duration at the same time;

(6) the visited intelligent network delivers the CONNECT instruction to connect up the call after the authentication succeeds; and (7) After receiving the CONNECT instruction, the MSC of the visited network determines the calling number as a special number, and connects to the roaming subscriber B directly to set up the call.

Embodiment 4

Figure 4:
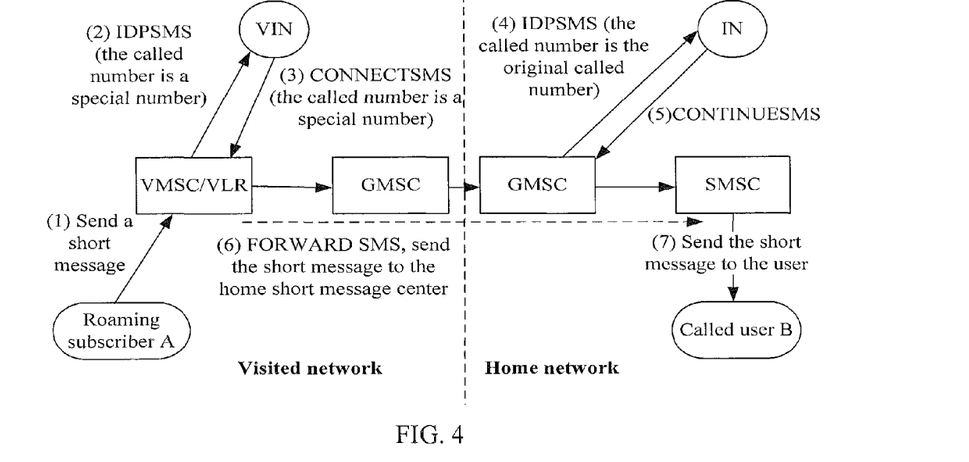
FIG. 4 is a schematic diagram of a short message service procedure according to Embodiment 4.

This embodiment provides a charging monitoring method to monitor the consumption amount of the international roaming subscriber accurately. The following takes a short message service procedure (CAP3 procedure) shown in FIG. 4 as an example to describe the monitoring method:

(1) a roaming subscriber A sends a short message request.

(2) the visited MSC determines that the calling subscriber is a roaming subscriber from abroad according to information on a VLR, stores the called number B and replaces the current called number with a previously defined special called number, and reports an IDP SMS message (the calling number is the roaming subscriber A, and the called number is the special number) to a visited IN first to trigger a mobile originated procedure based on a set GT code and a service key;

(3) the visited IN determines that the called number is the special number, and recognizes this is an authentication request of the roaming subscriber, and then, queries a number segment table according to the calling number to obtain a corresponding operator information, queries a credit limit of the operator and an accrued expense in the current period, and calculates the expense generated in the current service request; if the accrued expense is greater than or equal to the credit limit, the visited IN releases the call directly; if the accrued expense is less than the credit limit, the visited IN delivers a CONNECTSMS instruction to connect up the call (the called number is the special number);

(4) after receiving the CONNECTSMS instruction delivered by the intelligent network, the visited MSC recovers the original called number B, and sends an IDPSMS message to the home intelligent network to trigger a mobile originated procedure of SMS;

(5) the home intelligent network authenticates the calling user, and delivers the CONTINUESMS instruction if the authentication succeeds;

(6) the VMSC of the visited network receives the instruction from the home IN and then sends a FORWARD SMS message to send the content of a short message to the SMSC of the home network; and (7) the home SMSC sends the message to the called subscriber B.

Understandably, the embodiments above describe only the monitoring processes in the mobile originated procedure, mobile terminated procedure, and short message service procedure of the international roaming subscriber. However, the monitoring method disclosed herein is also applicable to monitoring the consumption amount of other services such as multimedia short message service and GPRS of the international roaming subscriber. The monitoring process in other services is basically the same as the three monitoring processes above, and is not repeated here any further.

Embodiment 5

Figure 5:
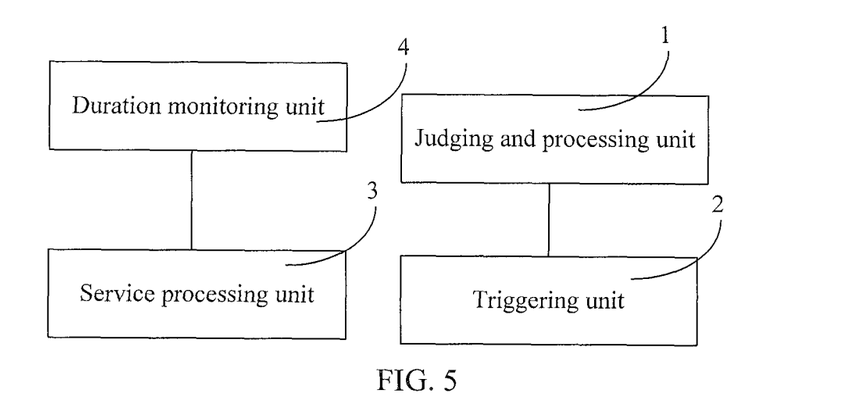
FIG. 5 is a structural block diagram of a charging monitoring device according to Embodiment 5.

This embodiment provides a charging monitoring device, which is applicable on a mobile switching center side to monitor the consumption amount of the international roaming subscriber. As shown in FIG. 5, the charging monitoring device includes a judging and processing unit 1, a triggering unit 2, and a service processing unit 3.

The judging and processing unit 1 is configured to judge whether a service request is sent by an international roaming subscriber according to a mobile number of a subscriber who sends the service request, and, if so, send a trigger instruction to the triggering unit.

The triggering unit 2 is configured to trigger a quota monitoring procedure for a consumption amount of the international roaming subscriber according to the trigger instruction sent by the judging and processing unit 1, where the quota monitoring procedure is set in a charging network element of an intelligent network.

Specifically, when the judging and processing unit 1 determines that a service request is sent by an international roaming subscriber, let the service request use the visited intelligent network service key and the GT code to uniformly trigger authentication at a charging network element of a set intelligent network system, where the service key and the GT code are stored by the judging and processing unit 1. The charging network element of the intelligent network system determines that the service request carries a specific number, and therefore, determines the service request as a specific roaming authentication request. After determining the service request as a specific roaming authentication request, the charging network element of the intelligent network system queries a corresponding number segment table to check whether an accrued expense of a home operator of the mobile number of the international roaming subscriber in the service request reaches a preset quota in the current period, thereby monitoring the quota.

The service processing unit 3 is configured to monitor the consumption amount of the international roaming subscriber through the quota monitoring procedure of the charging network element of the intelligent network to check whether the consumption amount reaches a preset quota; if the consumption amount does not reach the preset quota, approve the service request according to an approval instruction returned by the charging network element; and, if the consumption amount reaches the preset quota, reject the service request according to an rejection instruction returned by the charging network element.

Figure 6:
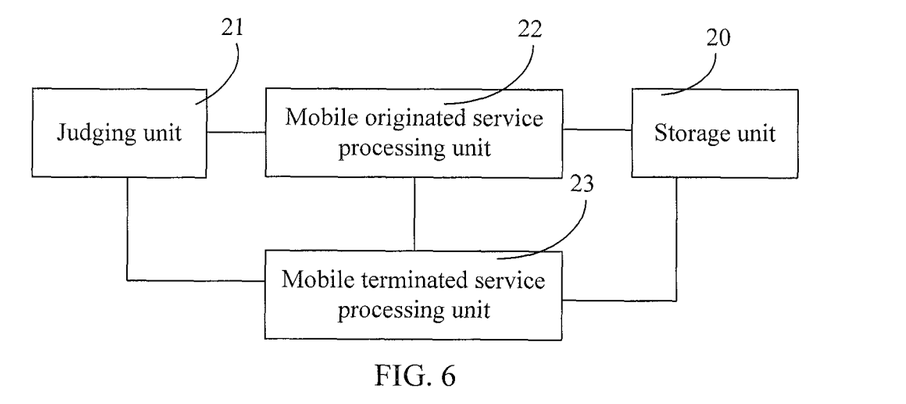
FIG. 6 is a structural block diagram of a judging and processing unit of the charging monitoring device according to the Embodiment 5.

As shown in FIG. 6, the judging and processing unit 1 in the monitoring device includes a storage unit 20, a judging unit 21, a mobile originated service processing unit 22, and a mobile terminated service processing unit 23.

The storage unit 20 is configured to store a specific number, a visited intelligent network service key, and a GT code.

The judging unit 21 is configured to, according to the mobile number of the subscriber who sends a mobile originated service request or mobile terminated service request, judge whether the service request is a mobile originated service request or mobile terminated service request sent by an international roaming subscriber.

The mobile originated service processing unit 22 is configured to, if the judging unit determines that the service request is the mobile originated service request sent by the international roaming subscriber, replace a called number in the mobile originated service request with a specific called number in the specific number stored in the storage unit 20, and store the replaced original called number.

The mobile terminated service processing unit 23 is configured to, if the judging unit determines that the service request is the mobile terminated service request sent by the international roaming subscriber, replace a calling number in the mobile terminated service request with a specific calling number in the specific number stored in the storage unit 20, and store the replaced original calling number.

The device may further include a duration monitoring unit 4, which is configured to, in a service implementation process after the service processing unit 3 approves the service request, monitor a corresponding duration for the service reported by the charging network element of the intelligent network system.

The charging monitoring device in this embodiment may work together with a charging monitoring device on the intelligent network system side, and, when the international roaming subscriber sends a service request, trigger the charging monitoring device on the intelligent network system side to monitor the consumption amount of the international roaming subscriber, and approve or reject the service request of the international roaming subscriber according to an instruction sent by the charging monitoring device on the intelligent network system side. The visited network system may use the credit limit of the operator of the home network to control the service request of the international roaming subscriber, thereby making the system monitor the charging for the consumption amount of the international roaming subscriber more accurately, and overcoming the inability of the existing system in monitoring the charging for the consumption amount of the international roaming subscriber accurately.

Embodiment 6

Figure 7:
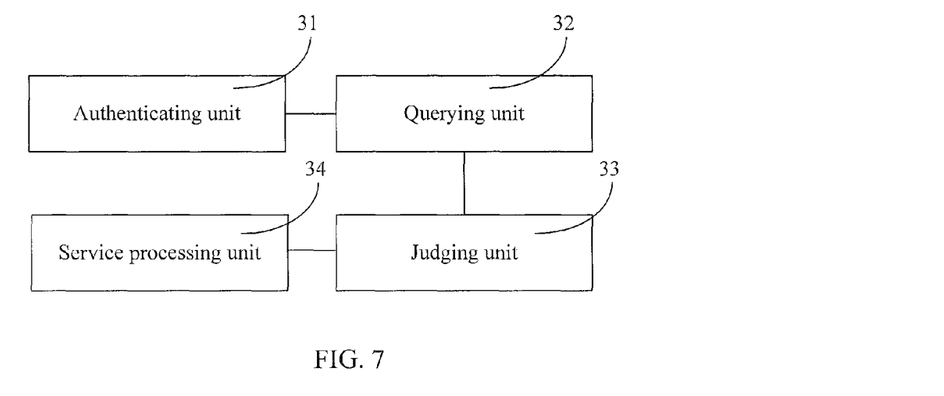
FIG. 7 is a structural block diagram of a charging monitoring device according to Embodiment 6.

This embodiment provides a charging monitoring device, which is applicable on an intelligent network system side to monitor the consumption amount of the international roaming subscriber. As shown in FIG. 7, the charging monitoring device includes an authenticating unit 31, a querying unit 32, a judging unit 33, and a service processing unit 34.

The authenticating unit 31 is configured to authenticate a triggered service request, and determine the triggered service request as a specific roaming authentication request if it is determined that the service request carries a specific number.

The querying unit 32 is configured to, after the authenticating unit determines the service request as the specific roaming authentication request, query a corresponding number segment table to determine a home operator of a mobile number of an international roaming subscriber who originates a mobile originated service.

The judging unit 33 is configured to judge whether an accrued expense of the operator in a current period reaches a preset quota.

The service processing unit 34 is configured to return an instruction of rejecting the service request if the judging unit determines that the accrued expense reaches the preset quota, and return an instruction of approving the service request if the judging unit determines that the accrued expense does not reach the preset quota.

The charging monitoring device in this embodiment may work together with the charging monitoring device on the mobile switching center side, and, when the international roaming subscriber sends a service request, monitor the consumption amount of the international roaming subscriber as triggered by the charging monitoring device on the mobile switching center side, and return an approval instruction or rejection instruction to the charging monitoring device on the mobile switching center side according to a monitoring result, whereupon the charging monitoring device on the mobile switching center side approves or rejects the service request from the international roaming subscriber according to the approval instruction or rejection instruction. The charging monitoring device makes the system monitor the charging for the consumption amount of the international roaming subscriber more accurately, and overcomes the inability of the existing system in monitoring the charging for the consumption amount of the international roaming subscriber accurately.

Embodiment 7

Figure 8:
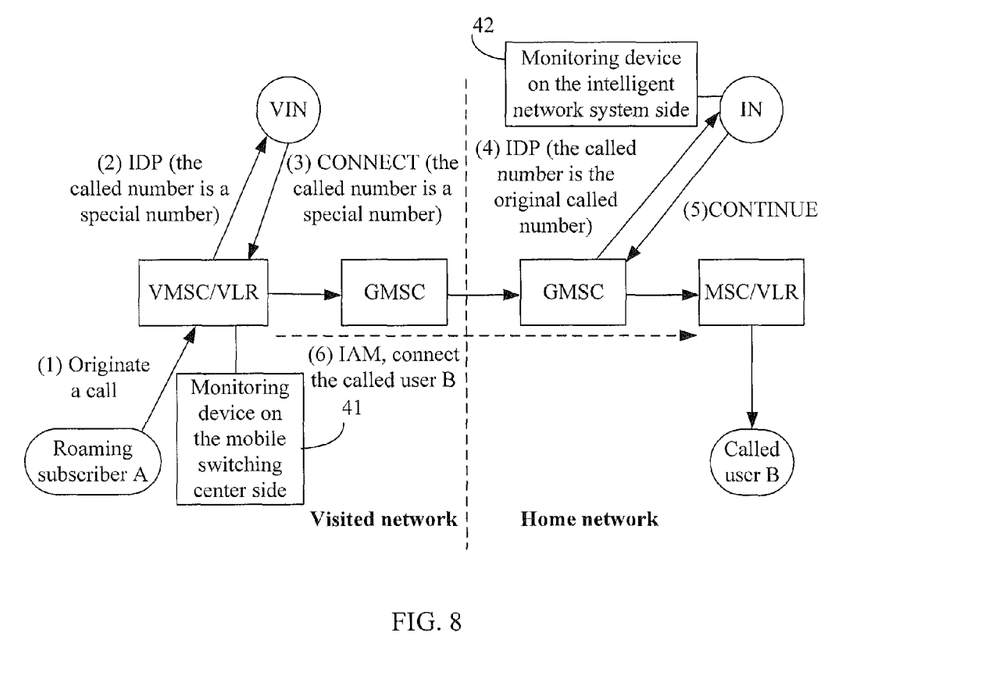
FIG. 8 is a schematic diagram of a charging monitoring system according to Embodiment 7.

This embodiment provides a charging monitoring system to monitor the charging for the consumption amount of the international roaming subscriber. As shown in FIG. 8, the system includes:

a device 41 on a mobile switching center side, a device 42 on an intelligent network system side, where the device 41 on the mobile switching center side is the charging monitoring device given in embodiment 5 above, and the device 42 on the intelligent network system side is the charging monitoring device given in embodiment 6 above.

The device 41 on the mobile switching center side is set on the mobile switching center side, and is configured to: store a specific number, a visited intelligent network service key, and a GT code; judge whether a service request is a service request sent by the international roaming subscriber according to the mobile number of the subscriber who sends the service request; if so, replace the number of the corresponding party of the international roaming subscriber party in the service request with a specific number stored in the storage unit, and store the replaced original number; and let the service request use the stored visited intelligent network service key and GT code to uniformly trigger authentication for the service request at a set intelligent network system; and approve the service request according to an approval instruction returned by the device 42 on the intelligent network system side, or reject the service request according to a returned rejection instruction.

The device 42 on the intelligent network system side is set on an intelligent network system side, and is configured to authenticate the service request triggered by the device on the mobile switching center; if the service request carries a specific number, determine the service request as a specific roaming authentication request, and therefore, query the corresponding number segment table to check whether the accrued expense of the home operator of the mobile number of the international roaming subscriber in the service request reaches a preset quota in the current period; if the preset quota is reached, return a rejection instruction to the device 41 on the mobile switching center side; if the preset quota is not reached, return an approval instruction to the device 41 on the mobile switching center side.

The embodiments provide a charging monitoring system, comprising:

a device on a mobile switching center side and a device on an intelligent network system side;

the device on the mobile switching center side is set on the mobile switching center side, and is configured to: store a specific number, a visited intelligent network service key, and a GT code; judge whether a service request is a service request sent by an international roaming subscriber according to the mobile number of the subscriber who sends the service request; if so, replace the number of the corresponding party of the international roaming subscriber party in the service request with a specific number stored in a storage unit, and store the replaced original number; and let the service request use the stored visited intelligent network service key and GT code to uniformly trigger authentication for the service request at a set intelligent network system; and approve the service request according to an approval instruction returned by the device on the intelligent network system side, or reject the service request according to a returned rejection instruction; and the device on the intelligent network system side is set on an intelligent network system side, and is configured to authenticate the service request triggered by the device on the mobile switching center; if the service request carries a specific number, determine the service request as a specific roaming authentication request, and therefore, query a corresponding number segment table to check whether accrued expense of a home operator of the mobile number of the international roaming subscriber in the service request reaches a preset quota in a current period; if the preset quota is reached, return the rejection instruction to the device on the mobile switching center side; if the preset quota is not reached, return the approval instruction to the device on the mobile switching center side.

The embodiments also provide a charging monitoring system, comprising:

a device on a mobile switching center side and a device on an intelligent network system side, wherein the device on the mobile switching center side is set at the mobile switching center and is communicatively connected with the device on the intelligent network system side which is set in an intelligent network, wherein the device on the mobile switching center side comprises:

a judging and processing unit, a triggering unit, and a service processing unit; wherein the judging and processing unit is configured to judge whether a service request is sent by an international roaming subscriber according to a mobile number of a subscriber who sends the service request, and, if so, send a trigger instruction to the triggering unit;

the triggering unit is configured to trigger a quota monitoring procedure for a consumption amount of the international roaming subscriber according to the trigger instruction sent by the judging and processing unit, wherein the quota monitoring procedure is set in a charging network element of the intelligent network;

the service processing unit is configured to monitor a consumption amount of the international roaming subscriber through the quota monitoring procedure of the charging network element of the intelligent network to check whether the consumption amount reaches a preset quota; if the consumption amount does not reach the preset quota, approve the service request according to an approval instruction returned by the charging network element; and, if the consumption amount reaches the preset quota, reject the service request according to an rejection instruction returned by the charging network element;

the device on the intelligent network system side comprises:

an authenticating unit, a querying unit, a judging unit, and a service processing unit; wherein the authenticating unit is configured to authenticate a triggered service request, and determine the triggered service request as a specific roaming authentication request if it is determined that the service request carries a specific number;

the querying unit is configured to, after the authenticating unit determines the service request as a specific roaming authentication request, query a corresponding number segment table to determine a home operator of a mobile number of an international roaming subscriber who originates a mobile originated service;

the judging unit is configured to judge whether an accrued expense of the operator in a current period reaches the preset quota; and the service processing unit is configured to return an instruction of rejecting the service request if the judging unit determines that the accrued expense reaches the preset quota, and return an instruction of approving the service request if the judging unit determines that the accrued expense does not reach the preset quota.

In the charging monitoring system, the judging and processing unit of the device on the mobile switching center side comprises:

a storage unit, a judging unit, a mobile originated service processing unit, and a mobile terminated service processing unit, wherein the storage unit is configured to store a specific number, a visited intelligent network service key, and a GT code;

the judging unit is configured to, according to a mobile number of a subscriber who sends a mobile originated service request or mobile terminated service request, judge whether the service request is a mobile originated service request or a mobile terminated service request sent by an international roaming subscriber;

the mobile originated service processing unit is configured to, if the judging unit determines that the service request is a mobile originated service request sent by an international roaming subscriber, replace a called number in the mobile originated service request with a specific called number in the specific number stored in the storage unit, and store the replaced called number; and the mobile terminated service processing unit is configured to, if the judging unit determines that the service request is a mobile terminated service request sent by an international roaming subscriber, replace a calling number in the mobile terminated service request with a specific calling number in the specific number stored in the storage unit, and store the replaced calling number.

In the charging monitoring system, the device on the mobile switching center side further comprises:

a duration monitoring unit, configured to, in a service implementation process after the service processing unit approves the service request, monitor a corresponding duration reported by the charging network element of the intelligent network.

Overall, in the embodiments, when an international roaming subscriber sends a service request, by triggering a quota monitoring procedure for the consumption amount of the international roaming subscriber in the charging network element of the intelligent network system real time monitoring whether the international roaming subscriber exceeds the preset quota for the consumption amount is realized, and whether to approve or reject the service request of the international roaming subscriber is determined according to the preset quota. In this way, it is ensured that the visited network system currently providing services can monitor the consumption amount of the international network roaming subscriber conveniently and accurately.

Persons of ordinary skill in the art should understand that all or part of the steps of the procedures involved in any embodiment may be implemented by a program instructing relevant hardware. The program may be stored in a computer readable storage medium such as ROM/RAM, magnetic disk, or CD-ROM.

Although various exemplary embodiments are described, the claims are not limited to such embodiments. It is apparent that those skilled in the art can make modifications and variations to the embodiments. Such modified embodiments are understood to fall within the scope of protection defined by the following claims or their equivalents.

What is claimed is:

1. A charging monitoring method, comprising:
   triggering a quota monitoring procedure for a consumption amount of an international roaming subscriber when it is determined that a service request is specific to the international roaming subscriber, wherein the quota monitoring procedure is performed by a charging network element of an intelligent network system; and
   monitoring the consumption amount of the international roaming subscriber through the quota monitoring procedure to determine whether the consumption amount reaches a preset quota;
   if the consumption amount reaches the preset quota, rejecting the service request according to a rejection instruction returned by the charging network element;

if the consumption amount does not reach the preset quota, approving the service request according to an approval instruction returned by the charging network element;

wherein the triggering of the quota monitoring procedure for the consumption amount of the international roaming subscriber when it is determined that the service request is specific to the international roaming subscriber comprises:

if a mobile number of a subscriber who sends the service request is an international roaming number, determining that the service request is a service request sent by the international roaming subscriber;

storing a specific number, a visited intelligent network service key, and a (Global Title) GT code in a mobile switching center;

replacing an original number of a corresponding party of the international roaming subscriber in the service request sent by the international roaming subscriber with the specific number stored in the mobile switching center;

storing the replaced original number; and allowing the service request to use the stored visited intelligent network service key and the GT code to trigger the quota monitoring procedure for the consumption amount of the international roaming subscriber, wherein the quota monitoring procedure is performed by the charging network element of the intelligent network system.

2. The charging monitoring method according to claim 1, wherein:

triggering of the quota monitoring procedure for the consumption amount of the international roaming subscriber in the charging network element of the intelligent network system comprises:

authenticating the service request in the charging network element of the intelligent network system;

determining the service request as a specific roaming authentication request if the charging network element of the intelligent network system determines that the service request carries the specific number;

after the charging network element determines the service request as a roaming authentication request, querying a corresponding number segment table to determine whether an accrued expense of a home operator of the mobile number of the international roaming subscriber in the service request in a current period reaches a preset quota;

if the preset quota is reached, returning the rejection instruction to reject the service request; and if the preset quota is not reached, returning the approval instruction to approve the service request.

3. The charging monitoring method according to claim 2, wherein:

the preset quota is a quota set according to the accrued expense of the international roaming subscriber in a period.

4. The charging monitoring method according to claim 3, further comprising:

for a mobile terminated service initiated for the international roaming subscriber, replacing a calling number in the mobile terminated service with a specific calling number in a specific number stored in a mobile switching center; and storing the replaced calling number.

5. The charging monitoring method according to claim 1, wherein:

the preset quota is a quota set according to the accrued expense of the international roaming subscriber in a period.

6. The charging monitoring method according to claim 5, further comprising:

for a mobile terminated service initiated for the international roaming subscriber, replacing a calling number in the mobile terminated service with a specific calling number in a specific number stored in a mobile switching center; and storing the replaced calling number.

7. The charging monitoring method according to claim 1, further comprising:

in a service implementation process performed after the service request is approved, reporting a corresponding duration to the charging network element of the intelligent network system.

8. The charging monitoring method according to claim 2, further comprising:

for a mobile originated service initiated by the international roaming subscriber, replacing a called number in the mobile originated service with a specific called number in a specific number stored in a mobile switching center; and storing the replaced called number.

9. The charging monitoring method according to claim 2, further comprising:

in a service implementation process performed after the service request is approved, reporting a corresponding duration to the charging network element of the intelligent network system.

10. A charging monitoring system, comprising: at least a processor operating in conjunction with a non-transitory computer readable medium which stores program codes, wherein the stored program codes when being executed by the processor, cause the charging monitoring system to:

judge whether a service request is sent by an international roaming subscriber according to a mobile number of a subscriber who sends the service request, and, if so, trigger a quota monitoring procedure for a consumption amount of the international roaming subscriber; and monitor a consumption amount of the international roaming subscriber through the quota monitoring procedure to determine whether the consumption amount reaches a preset quota; if the consumption amount does not reach the preset quota, approve the service request according to an approval instruction; and, if the consumption amount reaches the preset quota, reject the service request according to an rejection instruction;

wherein when the program codes cause the processor to judge whether the service request is sent by the international roaming subscriber according to the mobile number of the subscriber who sends the service request, the program codes cause the charging monitoring system specifically to:

store a specific number, a visited intelligent network service key, and a (Global Title) GT code;

according to a mobile number of a subscriber who sends a mobile originated service request or mobile terminated service request, judge whether the service request is a mobile originated service request or mobile terminated service request sent by the international roaming subscriber;

if it is determined that the service request is the mobile originated service request sent by the international roaming subscriber, replace a called number in the mobile originated service request with a specific called number in the specific number, and store the replaced called number; and if it is determined that the service request is the mobile terminated service request sent by the international roaming subscriber, replace a calling number in the mobile terminated service request with a specific calling number in the specific number, and store the replaced calling number.

11. The charging monitoring system according to claim 10, the program codes further cause the charging monitoring system to:

in a service implementation process after approving the service request, monitor a corresponding duration.

12. The charging monitoring system according to claim 10, the program codes further cause the charging monitoring system to comprising:

the service request, and determine the triggered-service request as a specific roaming authentication request if it is determined that the service request carries the specific number;

after determining the service request as the specific roaming authentication request, query a corresponding number segment table to determine a home operator of the mobile number of the international roaming subscriber who originates the mobile originated service;

determine whether an accrued expense of the operator in a current period reaches the preset quota; and return the rejection instruction for rejecting the service request if determining that the accrued expense reaches the preset quota, and return the approval instruction of approving the service request if determining that the accrued expense does not reach the preset quota.

* * * * *

UNITED STATES PATENT AND TRADEMARK OFFICE
CERTIFICATE OF CORRECTION

| | | |
|---|---|---|
| PATENT NO. | : 8,971,844 B2 | Page 1 of 1 |
| APPLICATION NO. | : 13/722627 | |
| DATED | : March 3, 2015 | |
| INVENTOR(S) | : Weicong Deng | |

It is certified that error appears in the above-identified patent and that said Letters Patent is hereby corrected as shown below:

In the Claims

In column 17, claim 12, line 17, before "the service request," insert --authenticate--.

Signed and Sealed this
Fourth Day of August, 2015

Michelle K. Lee
*Director of the United States Patent and Trademark Office*